(12) United States Patent
Fogler

(10) Patent No.: US 6,179,150 B1
(45) Date of Patent: Jan. 30, 2001

(54) SUPPORT FRAME AND CART FOR COLLAPSIBLE REFUSE BAG

(76) Inventor: Richard D. Fogler, 3401 N. Bigelow, Peoria, IL (US) 61604

( * ) Notice: Under 35 U.S.C. 154(b), the term of this patent shall be extended for 0 days.

(21) Appl. No.: 09/257,642

(22) Filed: Feb. 25, 1999

(51) Int. Cl.[7] ................................................. B65D 90/04
(52) U.S. Cl. .................... 220/489; 220/485; 220/495.11; 220/908.1
(58) Field of Search ..................................... 220/489, 485, 220/9.2, 9.4, 6, 495.08, 495.11, 908.1

(56) References Cited

U.S. PATENT DOCUMENTS

| | | | |
|---|---|---|---|
| 1,849,472 | * 3/1932 | Benedict | 220/485 X |
| 4,211,033 | * 7/1980 | Ringer | 220/485 X |
| 4,281,813 | * 8/1981 | Garrity | 220/485 X |
| 4,418,835 | * 12/1983 | Watts | 220/908.01 X |
| 4,441,734 | * 4/1984 | Schlissel | 220/485 X |
| 5,363,980 | * 11/1994 | Mulcahy | 220/495.11 X |
| 5,740,939 | * 4/1998 | Muldner et al. | 220/495.11 X |

* cited by examiner

Primary Examiner—Steven Pollard

(74) Attorney, Agent, or Firm—Emrich & Dithmar

(57) ABSTRACT

A folding wire frame includes first and second end panels and first and second pairs of hingedly coupled front and back panels, with each front and back panel also hingedly coupled to an adjacent end panel. When expanded, the folding wire frame forms a rectangular structure open at the top and bottom. Moving the two pairs of front and back panels inwardly toward one another where they are hingedly coupled allows the frame to be folded along its length in an accordion-like manner and to assume a collapsed configuration. The folded frame is adapted for insertion lengthwise in the open top of an upright refuse bag such as of paper and extends beyond the open top. The frame is then expanded, or unfolded, by grasping the front and back pairs of panels where they are hingedly coupled together and moving the front pair of panels away from the back pair of panels until the frame assumes a rectangular, semi-rigid configuration, with each panel engaging an inner surface of a side wall of the bag. Refuse can then be deposited in the expanded bag which is maintained upright by the flexible frame. When the bag is filled and before the material in the bag is tamped down, the frame is removed from the bag by grasping the sides of the frame and lifting it out of the bag, with the bag remaining upright. A wheeled cart includes a handle and a horizontal platform for supporting and transporting a filled bag.

13 Claims, 2 Drawing Sheets

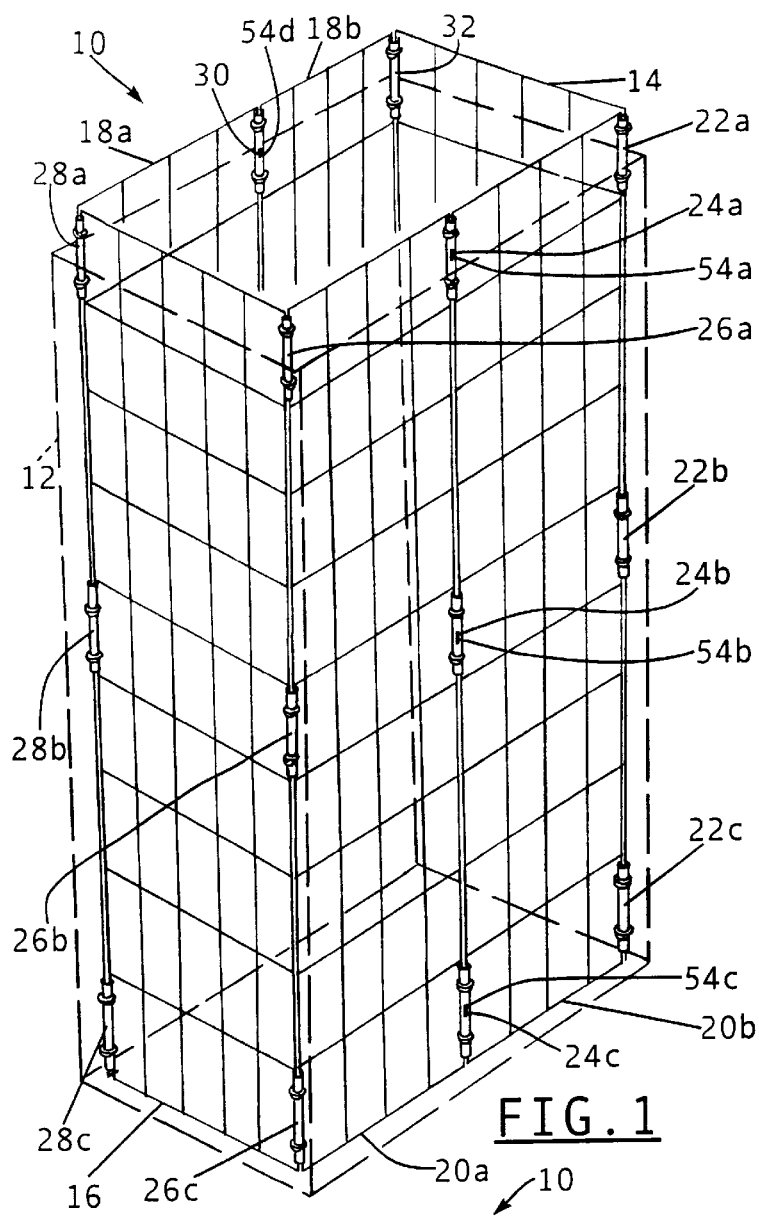
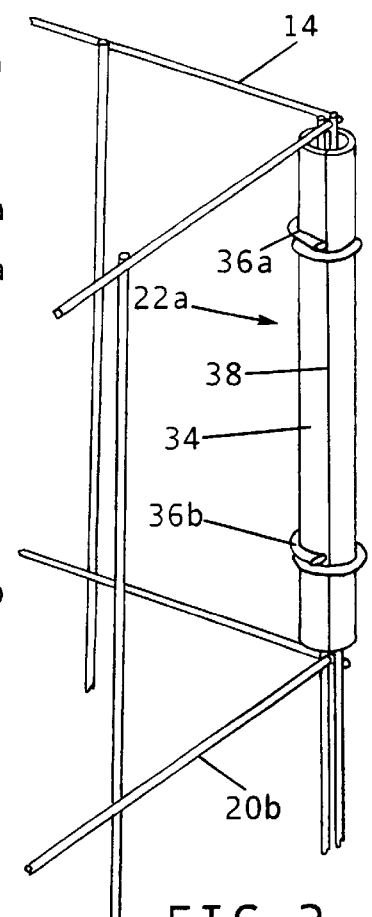
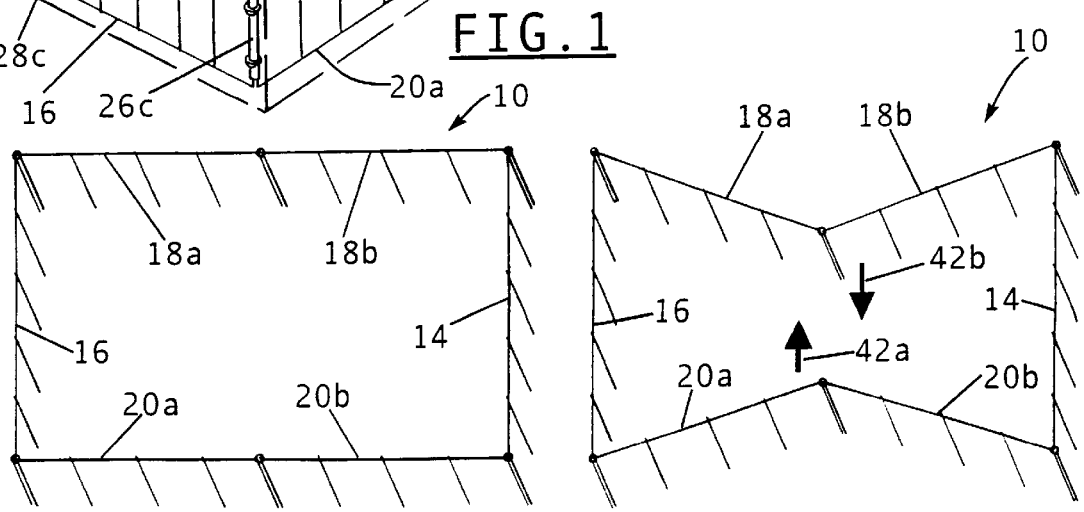
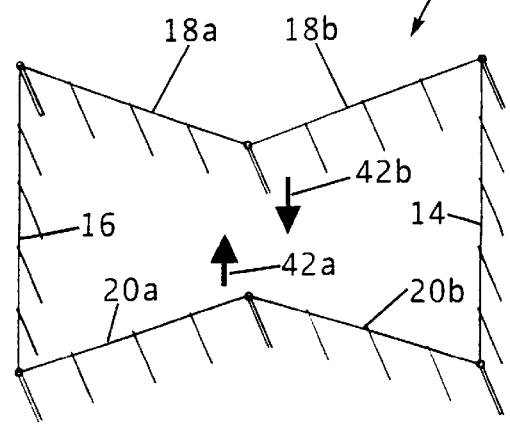
FIG. 1
FIG. 2
FIG. 3
FIG. 4

SUPPORT FRAME AND CART FOR COLLAPSIBLE REFUSE BAG

FIELD OF THE INVENTION

This invention relates generally to bags such as for collecting refuse such as grass cuttings, leaves or other debris and is particularly directed to a lightweight, folding frame adapted for maintaining a collapsible bag open and upright to facilitate filling the bag.

BACKGROUND OF THE INVENTION

Bags for collecting yard refuse are generally comprised of recyclable paper and are generally rectangular in cross section. A bag when purchased is folded to form a compact structure which is easily packaged for transport, display and sale. Yard refuse such as grass cuttings, leaves or other debris is typically deposited in the bag for disposal. A user of the bag must first unfold the bag and position it upright with its open end at the top. Because the bag is made of paper, it is collapsible and tends to bend along its original fold lines and to assume its original folded configuration. It is difficult for a user of the bag to maintain an empty bag unfolded, opened and expanded to accept the deposit of material in the bag. As more material is deposited in the bag, the bag tends to become self-standing and capable of supporting itself. However, even when filled, the typical refuse bag is unstable and is subject to being blown over by even a slight breeze. It is therefore highly desirable to maintain a collapsible refuse bag in an upright position, fully opened and stably supported as the bag is filled.

The present invention addresses the aforementioned limitations of the prior art by providing the above discussed desirable features in a folding support frame adapted for insertion in an opened collapsible bag, whereupon the frame is then unfolded to assume an expanded configuration and engage the inner walls of the bag for maintaining the bag stably upright, open and stretched to its full, unfolded size.

OBJECTS AND SUMMARY OF THE INVENTION

Accordingly, it is an object of the present invention to facilitate filling a collapsible bag with refuse or other material by maintaining the bag open at the top and bottom and upright while it is being filled.

Another object of the present invention is to provide a lightweight, easily folded and unfolded frame adapted for insertion in a collapsible bag for maintaining the bag open, upright and semi-rigid while being filled and which can be removed from the filled bag and re-used.

Yet another object of the present invention is to provide a foldable support frame and cart for use in filling a collapsible bag such as paper with refuse and transporting the filled bag.

This invention contemplates apparatus for facilitating the filling of a collapsible bag open at the top and bottom with material such as refuse by supporting and maintaining the bag in an upright, semi-rigid configuration, the apparatus comprising first and second generally planar end frames each having respective opposed lateral edges; third and fourth generally planar front panels and fifth and sixth generally planar back panels each having respective opposed lateral edges; first hinge means for pivotally coupling opposed lateral edges of the first end frame to first lateral edges of the third front and fifth back panels and second hinge means for pivotally coupling opposed lateral edges of said second end frame to first opposed lateral edges of said fourth front and sixth back panels; third hinge means for pivotally coupling second opposed lateral edges of the third and fourth front panels and fourth hinge means for pivotally coupling second opposed lateral edges of the fifth and sixth back panels, wherein the coupled panels form a generally rectangular, closed frame open at its top and bottom and adapted for folding to a compact configuration to facilitate insertion of the frame into the open top of the bag, whereupon the frame is adapted for unfolding to an expanded configuration wherein each of the panels engages an inner portion of the bag for maintaining the bag open and in an upright, semi-rigid configuration.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a perspective view of a support frame for a collapsible bag in accordance with the principles of the present invention;

FIG. 2 is a partial perspective view of a pair of connected panels in the support frame of FIG. 1 showing a hinge member connecting the two panels;

FIGS. 3 and 4 are partial upper perspective views of the support frame of the present invention respectively showing the frame in the fully unfolded, or expanded, configuration and in the partially folded configuration;

DETAILED DESCRIPTION OF THE PREFERRED EMBODIMENTS

Figure 5:
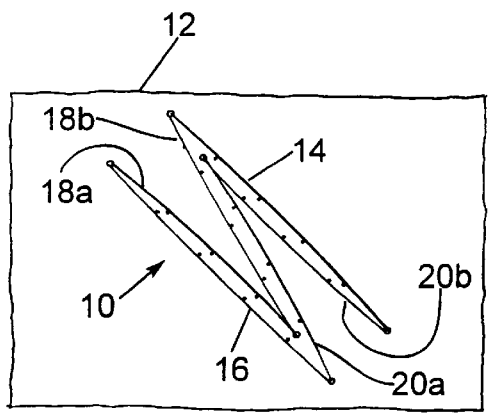
FIG. 5 is a top plan view of a support frame and bag combination in accordance with the present invention showing the manner in which the folded support frame is inserted in the open bag.

Referring to FIG. 1, there is shown a perspective view of a support frame 10 inserted in a collapsible bag 12 (shown in dotted line form in the figure) for maintaining the bag open at the top and bottom and in a stable, upright position to facilitate filling the bag with refuse such as yard waste. The folding support frame 10 is comprised of first and second end panels 14 and 16. The support frame 10 further includes first and second back panels 18a and 18b and first and second front panels 20a and 20b. Each of the panels shown in FIG. 1 is preferably comprised of a metal such as steel and is in the form of wire mesh. The panel's of the support frame 10 may be formed of other materials and may take on other forms as described below. Each of the panels is planar and rectangular in shape. The support frame 10 should preferable be lightweight and be comprised of a rigid, or semi-rigid, material of at least moderate strength so as to resist easy bending or damage caused by impact with other objects. The refuse bag 12 with which the support frame 10 is intended for use is typically comprised of paper and is generally 16" in length, 12" in width and 35" high. To accommodate a collapsible bag 12 of these dimensions, the end panels of the folding support frame 10 are preferably 10" wide, and each of the front and back panels is preferably 8" wide, while all of the panels are preferably 36" high so as to extend above the open end of the bag.

The edges of adjacent panels are connected by a plurality of hinges spaced along the lengths of the joined panels. Thus, hinges 22a, 22b and 22c connect adjacent edges of the first end panel 14 and the second front panel 20b. Similarly, hinges 26a, 26b and 26c pivotally connect adjacent edges of the second end panel 16 and the first front panel 20a. Hinges 28a, 28b and 28c connect the second end panel 16 to the first back panel 18a. Three hinges similarly pivotally connect adjacent edges of the first end panel 14 and the second back panel 18b, where only one of these hinges is shown as element 32 in the figure for simplicity.

In addition, adjacent edges of the first and second front panels 20a, 20b are pivotally connected by hinges 24a, 24b and 24c. Similarly, the first and second back panels 18a, 18b are pivotally connected by three spaced hinges, where only one of these hinges is shown in the figure as element 30 for simplicity. The hinged connections between the panels of the support frame 10 shown in FIG. 1 allow it to fold as described below.

Referring to FIG. 2, there is shown adjacent portions of the first end panel 14 and the second front panel 20b and one of the hinges 22a pivotally connecting these panels. Hinge 22a includes a plastic tube 34 preferably comprised of vinyl which includes a slit 38 extending the length of the tube to permit it to be positioned around adjacent portions of the pivotally connected panels. Disposed about the plastic tube 34 are a pair of spaced wire rings 36a and 36b which are crimped about the tube for maintaining the tube securely about adjacent portions of the pivotally coupled panels. The plastic tube of each of the hinges frictionally engages adjacent portions of coupled panels in a manner so as to maintain the relative position of the coupled panels. Thus, when the support frame 10 is extended to the fully unfolded configuration or is reconfigured to a folded position, the support frame maintains its configuration and a force must be applied to the frame to change its configuration. This aspect of the present invention is important because when the support frame 10 is fully unfolded within a paper bag, it maintains its fully unfolded configuration and also maintains the bag open and in a stable upright position.

Figure 6:
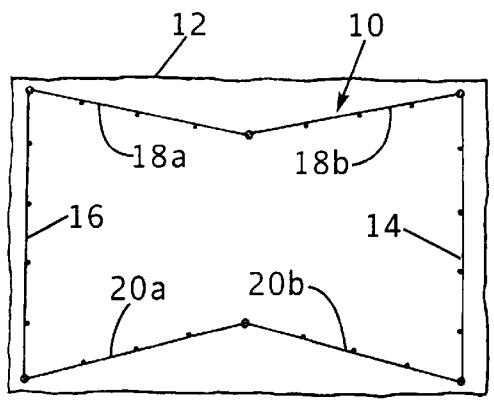
FIGS. 6 and 7 are top plan views respectively showing the support frame in the partially unfolded and fully unfolded configurations within the collapsible bag.
Figure 7:
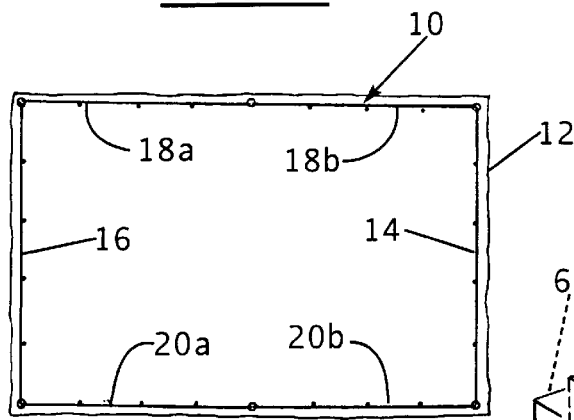

Referring to FIG. 3, there is shown an upper perspective view of the inventive support frame 10 shown in the fully unfolded, or expanded, configuration. The support frame 10 is folded by moving the adjacent, coupled portions of the first and second back panels 18a, 18b and first and second front panels 20a, 20b toward each other in the directions of arrows 42a and 42b as shown in the perspective view of the partially folded support frame 10 of FIG. 4. In order to identify for the user of the inventive support frame 10 in which direction the support frame is to be initially folded, each of the hinges connecting adjacent portions of the first and second back panels 18a, 18b and the first and second front panels 20a, 20b is provided with indicia in the form of a stripe or other readily identifiable mark. Thus, as shown in FIG. 1, hinges 24a, 24b and 24c pivotally connecting the first and second front panels 20a, 20b are each provided with a respective indicia mark 54a, 54b and 54c in the form of a colored stripe. In addition, hinge 30 pivotally coupling adjacent portions of the first and second back panels 18a, 18b is provided with an indicia mark 54d as shown in the figure. The support frame 10 is folded until the coupled edges of the first and second back panels 18a, 18b and the coupled edges of the first and second front panels are in close proximity, followed by folding of the corner hinges connecting the two end panels with the front and back panels as shown in the top plan view of FIG. 5. In FIG. 5, the support frame 10 is shown in the fully folded configuration as it is inserted in the collapsible bag 12. The support frame 10 is inserted in the bag 12 such that its longitudinal axis when folded is aligned diagonally with the generally rectangular cross section of the bag to facilitate insertion of the support frame into the bag. The support frame 10 is then rotated approximately ¼ turn, or 45°, and partially unfolded so that the support frame's first and second end panels 14,16 are disposed adjacent the ends of the collapsible bag 12 as shown in FIG. 6. The support frame 10 is then completely unfolded by further displacing the connected portions of the back and front panels away from each other and toward the front and back portions of the collapsible bag 12. When fully unfolded, the end, back and front panels of the support frame 10 are in closely spaced relation to the corresponding sides of the collapsible bag 12 as shown in the top plan view of FIG. 7. As stated earlier, the frictional engagement of each of the hinges with the coupled portions of adjacent panels of the support frame 10 maintains the support frame in the fully unfolded configuration so as to maintain the collapsible bag 12 open and upright.

Figure 8:
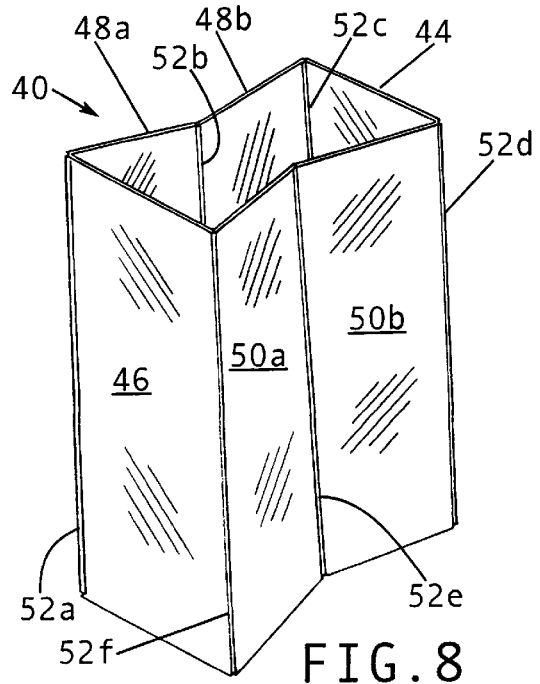
FIG. 8 is a perspective view showing another embodiment of a support frame in accordance with the present invention, where the support frame is made from a single piece of rigid, or semi-rigid, material formed into a plurality of folding panels.

Referring to FIG. 8, there is shown another embodiment of a support frame 40 in accordance with the principles of the present invention. Support frame 40 includes first and second end panels 44 and 46. Support frame 40 further includes first and second back panels 48a and 48b and first and second front panels 50a and 50b. In the embodiment shown in FIG. 8, the support frame 40 is comprised of a single, solid piece of rigid or semi-rigid material such as plastic or metal. Support frame 40 is provided with a plurality of linear, spaced score or crimp lines 52a–52f disposed between adjacent panels of the support frame. Score lines 52a–52f facilitate folding of the support frame 40 between adjacent, coupled panels as shown in FIG. 8 and as in the case of the earlier described support frame embodiment.

Figure 9:
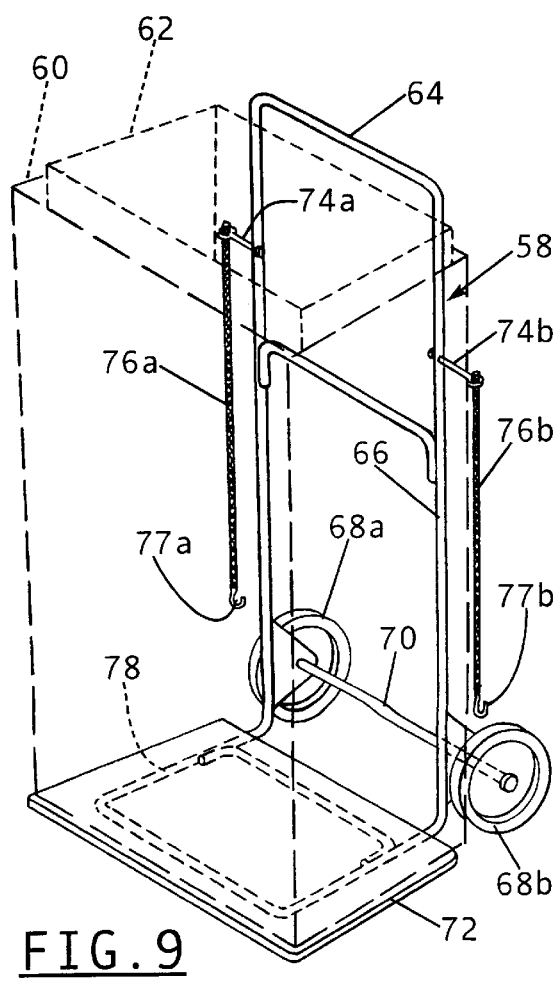
FIG. 9 is an upper perspective view of a cart for supporting and transporting a bag filled with residue or debris using the support frame of the present invention.

Referring to FIG. 9, there is shown a perspective view of a cart 58 for use in supporting and transporting a collapsible bag 60 which is shown in the figure in dotted line form. Also shown in the figure in dotted line form is a support frame 62 disposed within and extending above the collapsible bag 60 as previously described. The cart 58 includes an intermediate frame portion 66, an upper handle 64, and a lower frame portion 78 (shown in dotted line form). The handle 64, intermediate frame portion 66 and lower frame portion 78 are connected and form an integral frame structure. Disposed on a lower portion of the frame structure is the combination of an axle 70 and first and second wheels 68a and 68b for displacing the cart 58. A lower support platform 72 disposed on and attached to the lower frame portion 78 is generally flat and adapted for supporting the collapsible bag 60. Attached to respective lateral portions of the intermediate frame portion 66 are first and second eyebolts 74a and 74b. Attached respectively to the first and second eyebolts 74a, 74b are first and second elastic straps 76a and 76b. Disposed on respective distal ends of the first and second elastic straps 76a, 76b are first and second distal hooks 77a and 77b. The first and second elastic straps 76a, 76b are adapted for positioning around the collapsible bag 70 either when filled or with the support frame 62 disposed in the bag and the first and second distal hooks 77a, 77b positioned in mutual engagement. The first and second elastic straps 76a, 76b maintain the collapsible bag 70 securely on the cart's lower support platform 72 as the bag is filled or during transport of the bag on the cart 58. The first and second eyebolts 74a and 74b provide lateral extensions of the cart's intermediate frame portion 60 and permit the first and second elastic straps 76a, 76b to be wrapped around the collapsible bag 60 in a manner which lessens the tendency to cause a support frame 62 disposed within the bag to fold.

There has thus been shown a folding support frame adapted for positioning within an open collapsible bag for maintaining the bag in a stable upright position and opened to receive refuse or other material. The support frame includes a pair of end panels, and a pair of back panels as well as a pair of front panels, where each of the back and front panels is pivotally coupled to one of the end panels. The back panels are also pivotally coupled together as are the front panels so as to form a generally rectangular structure open at the top and bottom. The support frame may be in the form of a plurality of wire mesh panels pivotally coupled together by means of hinges. Another embodiment of the support frame envisions a unitary piece of lightweight, rigid or semi-rigid material such as a plastic or metal which is formed into a plurality of pivotally coupled sections or panels. Score, or crimp, lines connect adjacent panels allowing the unitary support frame which is open at the top and bottom to be folded for insertion in an open bag and to be unfolded once in the bag. The support frame engages the inner surface of the bag and maintains the bag in an open, upright and generally rectangular configuration for receiving refuse. When the bag is filled and before the material in the bag is compressed or tamped down, the frame is removed from the bag by grasping the sides of the frame and lifting it out of the bag. The bag then remains upright and open at the top to receive additional refuse. A wheeled cart includes an upper handle and a lower horizontal platform for supporting and transporting a filled bag. Flexible, stretchable cords are attached to the cart and are adapted for positioning about a bag and folding frame combination disposed on the cart's platform. The cords maintain the bag and folding frame combination, or a filled bag, securely in position on the platform for transporting the bag.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. Apparatus for holding material such as refuse comprising:
   a collapsible bag open at the top; and
   a frame for facilitating the filling of said collapsible bag by supporting and maintaining the bag in the upright, semi-rigid configuration, said frame comprising:
   first and second generally planar end panels each having respective opposed lateral edges;
   third and fourth generally planar front panels and fifth and sixth generally planar back panels each having respective opposed lateral edges;
   first hinge means for pivotally coupling opposed lateral edges of said first end panel to first lateral edges of said third front and fifth back panels and second hinge means for pivotally coupling opposed lateral edges of said second end panel to first opposed lateral edges of said fourth front and sixth back panels; and
   third hinge means for pivotally coupling second opposed lateral edges of said third and fourth front panels and fourth hinge means for pivotally coupling second opposed lateral edges of said fifth and sixth back panels, wherein said coupled panels form a generally rectangular, closed frame open at its top and bottom and adapted for folding to a compact configuration to facilitate insertion of said frame into the open top of the bag, wherein said frame extends above the open top of the bag, whereupon said frame is adapted for unfolding to an expanded configuration wherein with each of said panels engages an inner portion of the bag for maintaining the bag open and in an upright, semi-rigid configuration.

2. The apparatus of claim 1 wherein each of said panels is comprised of wire mesh.

3. The apparatus of claim 2 wherein each of said hinge means includes at least one plastic tube disposed about adjacent portions of coupled wire mesh panels.

4. The apparatus of claim 3 wherein each of said hinge means further includes one or more wire rings disposed about and engaging said plastic tube.

5. The apparatus of claim 1 further comprising indicia for identifying said third and fourth hinge means respectively coupling said front panels and said back panels to facilitate folding of said frame by moving said third and fourth hinge means toward one another.

6. The apparatus of claim 5 wherein said frame is unfolded to said expanded configuration by moving said third and fourth hinges away from one another so as to align said front panels and said back panels.

7. The apparatus of claim 1 wherein said bag is 16" long, 12" wide and 35" high, and wherein each of said front and back panels is 8" wide and each of said end frames is 10" wide, and wherein all of said panels are 36" high.

8. The apparatus of claim 1 wherein said frame is comprised of a unitary body having an open top and bottom and a plurality of spaced, parallel score lines extending between said open top and bottom and forming said planar panels in said unitary body, wherein said score lines connect and permit pivoting displacement between adjacent connected panels.

9. The apparatus of claim 8 wherein said unitary body is comprised of plastic or metal.

10. The apparatus of claim 1 further comprising a movable cart adapted to receive and support a bag containing said frame, said cart including retaining means engaging the bag for maintaining the bag securely in position on said cart.

11. The apparatus of claim 10 wherein said cart includes a platform for receiving and supporting said bag, and wheels and a handle to facilitate moving said cart.

12. The apparatus of claim 11 wherein said retaining means includes a flexible, elastic member attached to said handle and disposed about a bag disposed on said platform.

13. The apparatus of claim 12 wherein said handle extends above a bag and a frame disposed in said bag to support a container as the container is emptied into the bag.

* * * * *